Figure 1:
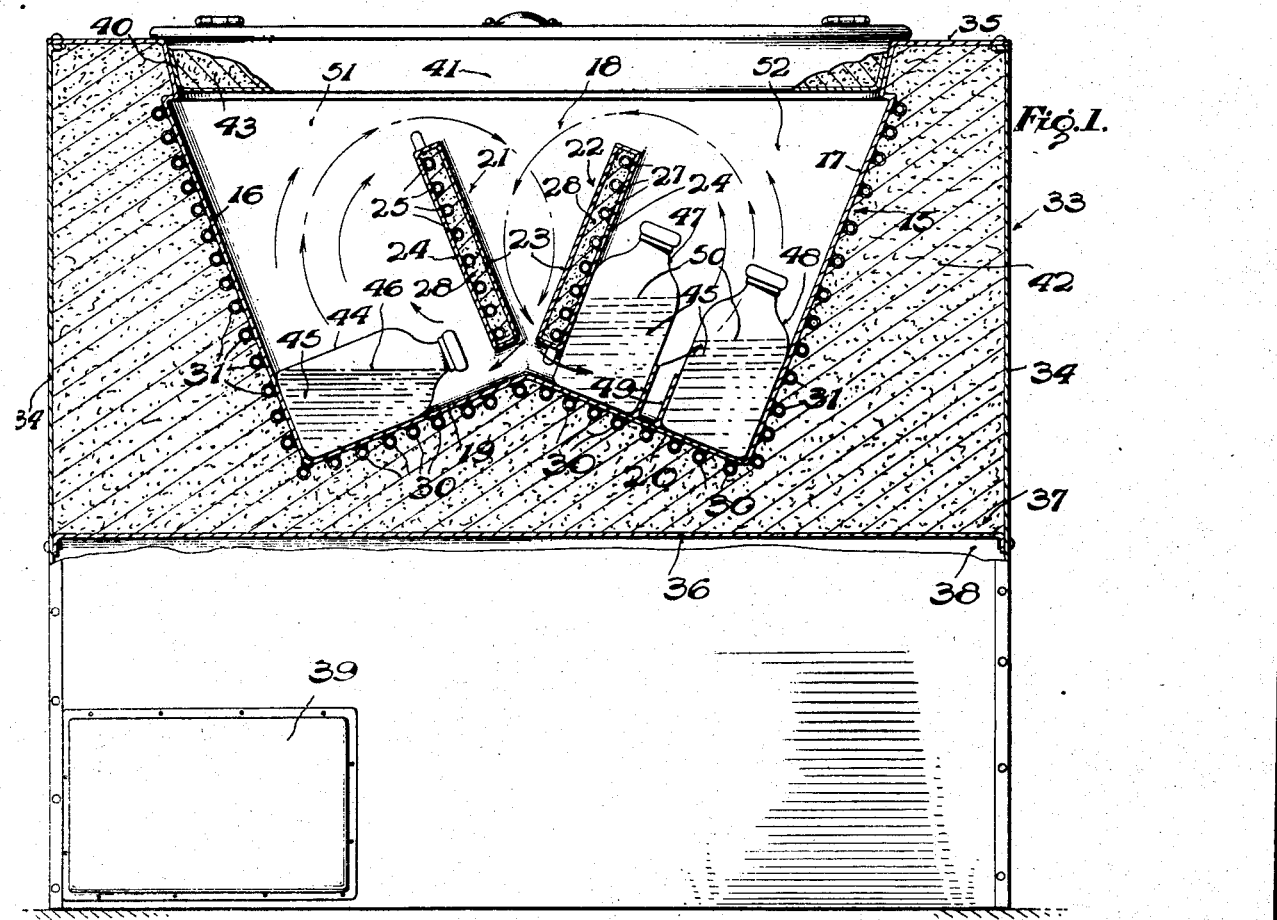

Aug. 15, 1944. S. A. LARSSON 2,356,068
REFRIGERATION
Filed July 27, 1942

Inventor
S. Arne Larsson
By J. A. Hobson Jr.
Attorney

Patented Aug. 15, 1944

2,356,068

UNITED STATES PATENT OFFICE 2,356,068

REFRIGERATION

Samuel Arne Larsson, New York, N. Y., assignor to Plas-Matic, Inc., New York, N. Y., a corporation of New York Application July 27, 1942, Serial No. 452,498

12 Claims. (Cl. 62—114)

This invention relates to refrigeration, and more particularly to freezing of the contents of containers.

One object of the invention is to provide an improved and more expeditious way of freezing the contents of individual containers by the conduction method.

Another object is to provide an improved way of quickly freezing liquid or other contents of sealed containers.

Another object is to provide an improved way to arrange sealed containers and quickly freeze their contents without damaging or breaking said containers.

Another object is to provide an improved way of increasing conduction freezing effect upon the contents of a sealed container in order to more quickly freeze said contents.

Another object is to provide a way to quickly freeze liquid or other contents of a sealed glass container by the conduction method and without cracking or breaking said container.

Another object is to provide a way to increase the expansion surface of liquid in a sealed container and thereafter quickly freeze the liquid, without damage to or breaking of the container, through conduction freezing effect produced upon said container.

Another object is to provide improved means for freezing liquid or other contents of a sealed container by conduction of the freezing effect thereto.

Another object is to provide freezing means which will support a sealed liquid container in inclined position to produce increased expansion surface of its liquid contents and thus prevent damage to or breaking of said container through freezing of said contents therein by said means.

Another object is to provide quick freezing means which will afford increased freezing effect by conduction upon liquid or other contents of a sealed container and thus more quickly freeze said contents in said container.

Another object is to provide freezing means constructed to support a sealed glass container in inclined position to increase expansion surface of liquid therein, and which is operable, without cracking or breaking of the container, to quickly freeze the liquid in said container when it is supported in said position.

Another object is to provide freezing means which has the freezing parts thereof arranged in an improved manner such as to produce increased circulation of freezing medium through said means with resulting increased efficiency thereof.

Another object is to provide improved freezing means of the conduction type which will quickly freeze the contents of sealed containers, enable circulation of air about the containers in a compartment in which they are placed to freeze said contents, and afford ready access to said compartment for placing of the containers therein and removal of the containers therefrom.

These and other objects of the invention will appear from the following description thereof.

In carrying out the invention any suitable type of refrigerating apparatus may be used, that is to say, one of the brine type, or of the inert gas type, or of the compressor-condenser-expander type, etc. As shown in the accompanying drawing forming part of this specification the refrigerating apparatus is of the compressor-condenser-expander type, but it is to be expressly understood that the invention is not limited to use of that particular type of apparatus.

Figure 2:
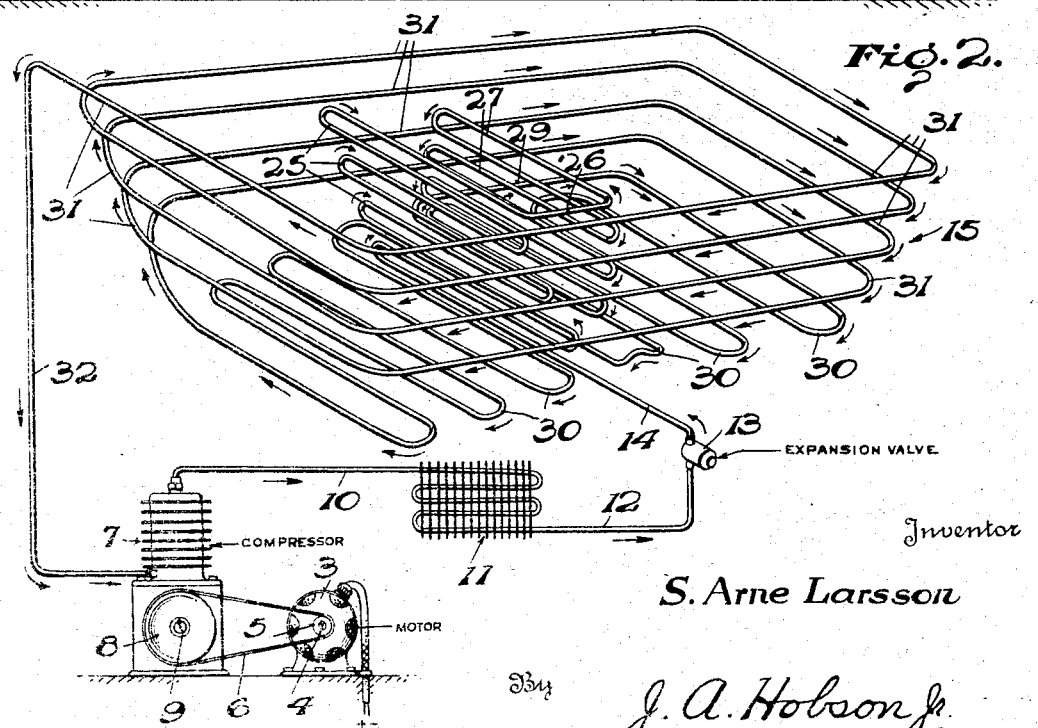

In said drawing:

Fig. 1 is a vertical longitudinal sectional view, partly in elevation, of a refrigerator constructed to embody and carry out the invention; and Fig. 2 is a diagrammatic view, partly in perspective and partly in elevation, of a compression-condenser-expander type refrigeration system for the refrigerator shown in Fig. 1.

Referring to the drawing, 3 indicates an electric motor (Fig. 2) supplied from a suitable source with electric current and started and stopped by any suitable means such as a thermally controlled switch (not shown). Motor 3 has an armature shaft 4 having fixed thereon a pulley 5 around which passes a belt 6. Motor 3 and belt 6 drive a compressor 7 of any suitable type, and for this purpose belt 6 passes around a pulley 8 fixed on the drive shaft 9 of said compressor.

Compressor 7 delivers compressed refrigerant fluid through a conduit 10 into a finned, air cooled condenser 11 wherein the refrigerant fluid is condensed to liquid. From condenser 11 the liquid refrigerant flows through a conduit 12 and an expansion valve 13 of any suitable type. The liquid refrigerant flowing from valve 13 passes through a conduit 14 into and through a quick freezing unit or expander indicated broadly at 15. The freezing unit 15 comprises, in addition to freezing parts or coils hereinafter described, a shell open at the top and made of galvanized sheet iron or other suitable metal. This shell has upwardly and outwardly inclined side walls 16 and 17 (Fig. 1), a rear wall 18, a front wall (not shown), and a bottom comprising walls 19 and 20 inclined downwardly and outwardly to the bottoms of said side walls from the center of said shell.

Arranged within the shell and connected with its front and rear walls are baffles indicated broadly at 21 and 22. These baffles are inclined upwardly and outwardly from the center of the shell in spaced parallel relation with walls 16 and 17, and said baffles are spaced from each other and from the bottom and top of the shell to afford circulation of air within said shell in clockwise and counter-clockwise directions indicated by the curved arrows in Fig. 1. Baffles 21 and 22 include side walls 23 and side walls 24 made of galvanized sheet iron or other suitable metal and spaced apart for purposes hereinafter set forth.

Refrigerant flows from pipe 14 upwardly through a plurality of coils 25 arranged one above another in baffle 21. Pipe 14 is connected through the front of the shell with the lowermost of the coils 25, and said coils are soldered or otherwise suitably secured upon the wall 24 of baffle 21 in good direct thermal contact with that wall. From the uppermost of coils 25 refrigerant flows through a pipe 26 (Fig. 2) into the uppermost of a plurality of coils 27 and then downwardly therethrough. Coils 27 are arranged one above another in baffle 22, and pipe 26 connects the uppermost of coils 27 and 25 through the walls 24 of said baffle and the baffle 21. Coils 27 are soldered or otherwise suitably secured on the wall 24 of baffle 22 in good direct thermal contact with that wall. Cork or other suitable insulating material 28 is packed in baffles 21 and 22 to insulate the coils therein from all surfaces of said baffles except those of the walls 24.

From the lowermost of coils 27 refrigerant flows through a pipe 29 (Fig. 2) into the right hand coil of a plurality of coils 30 and then through said coils to the left hand coil of said plurality. Coils 30 are soldered or otherwise suitably secured in good direct thermal contact with the outer surfaces of the inclined bottom walls 19 and 20 (Fig. 1) of the shell. From the left hand coil of the plurality of coils 30 refrigerant flows into the lowermost of a plurality of coils 31 and then upwardly through the latter. Coils 31 are soldered or otherwise suitably secured in good direct thermal contact with the outer surfaces of the side, rear and front walls of the shell.

The coils 25, 27, 30 and 31 are made of copper or other suitable metal, and from the uppermost of the coils 31 refrigerant fluid flows through a pipe 32 back to compressor 7 which compresses the refrigerant and circulates it through the described compressor-condenser-expander refrigerating apparatus in the manner explained above.

In Fig. 1 there is shown a refrigerator cabinet indicated broadly at 33 and having side walls 34, a top wall 35, and an intermediate wall 36 made of sheet metal and bolted or otherwise suitably secured together. Cabinet 33 is provided with a compartment 37 in which the quick freezing unit 15 is arranged. Cabinet 33 is provided below the compartment 37 with a compartment 38 for the motor 3, compressor 7 and condenser 11, and they are connected through wall 36 with unit 15 by the pipes 14 and 32. Compartment 38 has an opening 39 which may be closed by a door (not shown). The quick freezing unit 15 is open at the top thereof, and the top wall 35 of cabinet 33 is provided above said unit with an opening 40 in which is positioned a removable cover 41.

Suitable insulating material 42 is packed in compartment 37 around unit 15, and cover 41 is comprised by a metal shell filled with insulating material 43.

During operation of the refrigerating apparatus the side, rear and front walls of the shell, and the walls 24 of baffles 21 and 22, will become extremely cold so that when sealed containers are placed in the shell and supported therein in inclined positions by the walls, liquid or other contents of the containers will be quickly frozen by conduction of refrigerating effect from said walls through the containers to their contents. Sealed containers for liquid placed and supported in the shell are inclined in a manner such that increased expansion surface of the liquid is produced and damage to or breaking of the containers is prevented when their contents are frozen.

Thus, as shown in Fig. 1, a sealed glass container 44 having liquid 45 therein is placed in the unit 15 and supported by walls 16 and 19 in inclined position. An increased expansion surface 46 of the liquid 45 is thus produced which prevents cracking or breaking of the glass container 44 when said liquid is frozen therein. Container 44 may be round or rectangular in cross-section, but in either case two surfaces of the container bear against extremely cold walls of the unit 15 so that the contents of the container will be quickly frozen.

Further, container 44 may be positioned in a corner of unit 15 as, for example, the rear left corner, in which case the bottom of the container would engage cold side wall 16 of the unit and the side of the container would engage cold bottom wall 19 and cold rear wall 18 of said unit. The contents of container 44 would thus even be more quickly frozen, and if container 44 were in this case rectangular in cross-section, three surfaces of the container, to wit, the bottom and two sides thereof would have freezing effect applied therethrough to the contents of the container to more quickly freeze said contents.

Instead of arranging containers in the shell so that their sides rest on the bottom thereof as in the case of container 44, containers may be arranged in the shell so that their bottoms rest on the bottom of said shell. Thus, as shown in Fig. 1, two sealed glass containers 47 and 48 having liquid 45 therein are placed in the unit 15 so that the bottoms of said containers rest on the cold bottom wall 20 and the containers are spaced apart by spacers 49 on said bottom wall. Container 47 will, accordingly, be supported in inclined position and its side engages cold wall 24 of baffle 22. Container 48 will, accordingly, also be supported in inclined position and its side engages cold wall 17 of the shell. Increased expansion surfaces 50 of the liquid 45 in the glass containers 47 and 48 are thus produced which prevent cracking or breaking of said containers when said liquid is frozen therein.

Containers 47 and 48 may be round or rectangular in cross-section but in either case two surfaces of each container bear against extremely cold walls of the unit 15 so that the contents of the containers will be quickly frozen. Further, containers 47 and 48 may be positioned in corners of unit 15 as, for example, the rear corner formed by baffle 22 and wall 18, and the rear corner formed by said wall and the wall 17. In this case, the sides of containers 47 and 48 would also engage cold wall 18. The contents of containers 47 and 48 would thus even be more quickly frozen, and if the containers 47 and 48 were in this case rectangular in cross-section, three surfaces of each container, to wit, the bottom and two sides thereof would have freezing effect applied therethrough to the container contents to more quickly freeze the same.

The shell of the quick freezing unit 15 may be of any desired dimensions and capacity to accommodate a plurality of sealed containers in each of two compartments 51 and 52 defined by the shell walls and the baffles, and a plurality of containers could be positioned like container 44 in each of the compartments 51 and 52 in which case spacers 49 would be omitted, or a plurality of containers could be positioned like containers 47 and 48 on and around all of the cold walls of compartments 51 and 52 in which case wall 19 could be provided with spacers like those indicated at 49 on wall 20. In any case, baffles 21 and 22 afford circulation of air, as indicated by the curved arrows in Fig. 1, through compartments 51 and 52, between the sealed containers, and around the baffles whereby to assist quick freezing of the contents of the sealed containers by unit 15. If desired, circulation of air could be produced by a fan (not shown) arranged within the unit and constructed and operated in any suitable manner.

The operation of the refrigerator will be clearly understood from the foregoing and may be briefly summarized as follows. Motor 3 drives compressor 7 and refrigerant fluid, flowing in the direction of the arrows (Fig. 2), circulates through the condenser 11, the unit 15 and said compressor through the described connections therebetween. The side, rear and front walls of the shell of the quick freezing unit or expander 15, and the walls 24 of the baffles 21 and 22 are thus refrigerated and maintained extremely cold for quick freezing of liquid or other contents of sealed containers such as indicated at 44, 47 and 48 placed in the unit and supported in inclined positions therein in any of the ways above described. The shell of unit 15 is open at the top below cover 41 and the latter enables the containers to be placed in and removed from said unit.

Inclining of the containers 44, 47 and 48 produces increased expansion surfaces 46 and 50 of liquid contents 45 thereof, and this prevents damage, cracking or breaking of the containers when said contents are frozen. Containers placed in the shell of unit 15, as shown and described, have at least two surfaces or at least the bottom and one side in contact with extremely cold bottom and side walls of the shell or an extremely cold wall of the latter and a similar wall of one of the baffles 21 and 22. The contents of the containers will thus be quickly frozen, whereupon said containers may be removed from the refrigerator and stored in a suitable cold storage place.

It will of course be understood that plates with interconnected serpentine refrigerant conducting conduits or other forms of interconnected refrigerant conducting conduits pressed therein may be employed on the side, rear, front and bottom walls of the shell and on the baffles 21 and 22, instead of the coils herein described, and that the conduits of the plates could be connected through said walls and baffles and with the pipes 14 and 32 in any suitable manner and by any suitable means for these purposes. Accordingly, the expressions "means for refrigerating," "freezing parts," or the like, employed in the claims are intended to cover plates, or any devices or means in any type of refrigerating apparatus, applied to the shell walls and baffles to freeze the contents of sealed containers placed in the shell.

Further, the invention may be embodied in and carried out in apparatus which feeds sealed containers one after another and freezes their contents, as well as in a refrigerator such as herein shown wherein the sealed containers are stationary during freezing of their contents. It is therefore to be expressly understood that the invention is not limited to the structure herein described for embodying and carrying said invention out, or otherwise than by the terms of the appended claims.

Having thus described my invention what I claim is:

1. The method of refrigerating a container enclosing a vapor space and contents comprising fluent matter which expands on freezing, said method comprising supporting said container in an inclined position such that the area of the free surface of the fluent matter out of contact with the inner wall surface of the container is sufficiently increased to preclude bursting of the container upon freezing of the contents thereof, and removing heat from the container contents by conduction of said heat through at least two wall surfaces of the container to a refrigerant circulating in heat exchange therewith and capable of producing a temperature at least as low as the freezing point of said contents.

2. The method of refrigerating, in a closed space, a container placed therein and having contents comprising fluent matter, said method comprising the steps of freezing the fluent matter by conducting heat therefrom through at least two surfaces of the container to a refrigerant capable of producing a temperature at least as low as the freezing point of said fluent matter, and circulating such refrigerant on opposite sides of an air path in the closed space and thereby promoting circulation of cooled air across said container.

3. The method of refrigeration which comprises the steps of supporting a sealed container partly filled with contents comprising fluent matter, which expands upon freezing, in an inclined position such that a sufficiently increased expansion surface of the fluent matter is left in the container to prevent bursting thereof upon freezing of said contents, and freezing the contents of the container while it is in said inclined position by evaporating a refrigerant in heat exchange relation with at least two outer surfaces of said container.

4. The method of refrigeration which comprises the steps of supporting a sealed container partly filled with contents comprising fluent matter, which expands upon freezing, on two supporting surfaces so inclined as to hold the container in such position that a sufficiently increased expansion surface of the fluent matter is left in the container to prevent bursting thereof upon freezing of said contents, and freezing the contents of the container, while it is positioned as aforesaid, by conducting heat from said contents to an evaporating refrigerant in heat exchange relation with said two inclined supporting surfaces.

5. A device constructed to provide a compartment having an inclined bottom supporting surface and an adjacent inclined side supporting surface, said supporting surfaces being arranged to hold a sealed container partly filled with contents comprising fluent matter, which expands upon freezing, in an inclined position such that the area of the free surface of the fluent matter underlying an expansion space in the container is increased sufficiently to preclude bursting of said container upon freezing of said contents, and apparatus for freezing the contents of such inclined container comprising means for circulating a freezing medium in heat exchange relation with said inclined surfaces.

6. A device constructed to provide a compartment having an inclined bottom supporting surface and an adjacent inclined side supporting surface, said supporting surfaces being arranged to hold a sealed container partly filled with contents comprising fluent matter, which expands upon freezing, in an inclined position such that a sufficiently increased expansion surface of the fluent matter is left in the container to preclude bursting of said container upon freezing of said contents, and means for freezing the contents of such inclined container comprising freezing apparatus having parts for maintaining an evaporating refrigerant in heat exchange relation with said inclined surfaces.

7. A device provided with a pair of juxtaposed compartments having bottom walls inclined downwardly and outwardly and inner and outer side walls inclined upwardly and outwardly, and means for freezing contents of containers arranged in the compartments in contact with certain of said walls, the inner walls being spaced from each other and from the tops and bottoms of the compartments and provided with means for producing conditions which induce air to circulate through said compartments.

8. A device provided with a pair of juxtaposed compartments having bottom walls inclined downwardly and outwardly and outer walls inclined upwardly and outwardly, apparatus for freezing contents of containers placed within the compartments and supported in inclined positions by the inclined bottom and outer walls of the compartments, said freezing apparatus having means for evaporating a refrigerant in heat exchange relation with said walls and the surfaces of the containers engaged therewith, and means for producing conditions conducive to air circulation through the compartments comprising spaced baffles forming inner side walls thereof inclined upwardly and outwardly and having top portions below the tops of the outer side walls of the compartments and bottom portions above the bottoms of said compartments.

9. In a refrigerator of the type comprising an insulated cabinet, a shell of heat conducting material in said cabinet having downwardly and outwardly inclined bottom walls and upwardly and outwardly inclined side walls, said walls being arranged to support sealed containers partly filled with contents comprising fluent matter, which expands upon freezing, in inclined positions such that sufficiently increased expansion surfaces for the fluent matter are left in the containers to prevent bursting thereof upon freezing of said contents, and means for freezing the container contents comprising means to evaporate a refrigerant in heat exchange relation with the inclined shell walls and at least two surfaces of each container.

10. The method of refrigerating a sealed and partly filled container having contents comprising fluent matter which expands upon freezing, said method comprising the steps of supporting said container in an inclined position such that a sufficiently increased expansion surface of the fluent matter is left in the container to preclude bursting thereof upon freezing of said contents, and freezing the contents of the container while it is in said inclined position by conducting heat from the container contents through not less than two different wall portions of the container to a freezing medium supplied adjacent both of said wall portions in heat exchange relation therewith.

11. The method of refrigerating a commodity in a closed space, said method comprising the steps of circulating a freezing medium in heat exchange relation with at least two surfaces of said commodity, and circulating such medium on opposite sides of an air path in the closed space and thereby promoting a circulation of cooled air across said commodity.

12. In a device of the type provided with a normally closed space and means for circulating a freezing medium adjacent two surfaces of a commodity arranged in the closed space, means forming an air path in the closed spaced open thereto at its opposite ends, and means for supplying such medium at opposite sides of said path and thereby promoting circulation of cooled air across said commodity.

SAMUEL ARNE LARSSON.